(12) United States Patent
Mollick et al.

(10) Patent No.: US 9,644,329 B2
(45) Date of Patent: May 9, 2017

(54) RECYCLED ASPHALT PROCESS

(71) Applicant: Gencor Industries, Inc., Orlando, FL (US)

(72) Inventors: Joseph Mollick, Longwood, FL (US); Marc Elliott, Longwood, FL (US)

(73) Assignee: GENCOR INDUSTRIES, INC., Orlando, FL (US)

( * ) Notice: Subject to any disclaimer, the term of this patent is extended or adjusted under 35 U.S.C. 154(b) by 176 days.

(21) Appl. No.: 14/718,183

(22) Filed: May 21, 2015

(65) Prior Publication Data

US 2016/0201274 A1 Jul. 14, 2016

Related U.S. Application Data

(60) Provisional application No. 62/103,113, filed on Jan. 14, 2015.

(51) Int. Cl.
| | |
|---|---|
| *E01C 19/10* | (2006.01) |
| *C08L 95/00* | (2006.01) |
| *B01F 9/06* | (2006.01) |
| *B01F 9/00* | (2006.01) |

(52) U.S. Cl.
CPC ............ *E01C 19/1004* (2013.01); *B01F 9/06* (2013.01); *C08L 95/00* (2013.01); *E01C 19/1036* (2013.01); *E01C 19/1063* (2013.01); *B01F 2009/0063* (2013.01); *B01F 2009/0098* (2013.01); *B01F 2215/0063* (2013.01); *E01C 2019/109* (2013.01)

(58) Field of Classification Search
CPC ................ B01F 9/06; B01F 2009/0063; B01F 2009/0098; C08L 95/00; C09D 195/00; E01C 19/1004; E01C 19/1036; E01C 19/1063
See application file for complete search history.

(56) References Cited

U.S. PATENT DOCUMENTS

| | | | |
|---|---|---|---|
| 4,332,478 A | 6/1982 | Binz | |
| 4,954,995 A | 9/1990 | Marconnet | |
| 5,320,426 A | 6/1994 | Keylon et al. | |
| 5,322,367 A * | 6/1994 | Nath | E01C 19/1004 34/482 |

(Continued)

OTHER PUBLICATIONS

International Search Report mailed Mar. 11, 2016 in corresponding International Application No. PCT/US2016/012940, 4 pages.

(Continued)

*Primary Examiner* — Kaj K Olsen
*Assistant Examiner* — Alexandra M Moore
(74) *Attorney, Agent, or Firm* — Staas & Halsey LLP

(57) ABSTRACT

A method of making hot mix asphalt using recycled asphalt in which tertiary air is mixed with products of combustion at an exit of a refractory-lined chamber to produce hot controlled temperature process air, the temperature of the tertiary air being increased while the temperature of the products of combustion is decreased to adjust a temperature of the hot controlled temperature process air. Particles of the recycled asphalt are heated by exposing the particles to the hot controlled temperature process air in the rotary counter-flow dryer and mixer and moisture is removed from the recycled asphalt with the hot controlled temperature process air.

13 Claims, 15 Drawing Sheets

(56) References Cited

U.S. PATENT DOCUMENTS

| | | | |
|---|---|---|---|
| 5,344,229 A * | 9/1994 | Nath | E01C 19/1004 34/560 |
| 5,364,182 A | 11/1994 | Hawkins | |
| 5,470,146 A * | 11/1995 | Hawkins | C08L 95/00 34/137 |
| 5,664,881 A * | 9/1997 | Hawkins | E01C 19/1036 366/11 |
| 6,164,809 A * | 12/2000 | Hawkins | E01C 19/1036 110/226 |
| 7,758,235 B1 | 7/2010 | Collette | |

OTHER PUBLICATIONS

Written Opinion mailed Mar. 11, 2016 in corresponding International Application No. PCT/US2016/012940, 9 pages.

* cited by examiner

RECYCLED ASPHALT PROCESS

CROSS-REFERENCE TO RELATED APPLICATIONS

This application claims priority to U.S. Provisional Application No. 62/103,113, filed Jan. 14, 2015, the entire contents of which are incorporated herein by reference.

BACKGROUND

1. Field

The application relates to a process of making recycling asphalt.

2. Description of the Related Art

Current asphalt plant technology and recycling systems direct fire the aggregates in rotary dryers to high temperatures, or combine superheated virgin aggregates with recycled pavements in order to process recycled asphaltic pavements. High process temperatures degrade the quality of the bitumen in the asphalt pavements and oxidize the asphalt hydrocarbon binder constituent. Those processes discharge hazardous pollutants into the atmosphere along with the strong odors and visible smoke emissions.

SUMMARY

A method of making hot mix asphalt using recycled asphalt in which tertiary air is mixed with products of combustion at an exit of a refractory-lined chamber to produce hot controlled temperature process air, the temperature of the tertiary air being increased while the temperature of the products of combustion is decreased to adjust a temperature of the hot controlled temperature process air. Particles of the recycled asphalt are heated by exposing the particles to the hot controlled temperature process air in the rotary counter-flow dryer and mixer and moisture is removed from the recycled asphalt with the hot controlled temperature process air.

The above and other features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
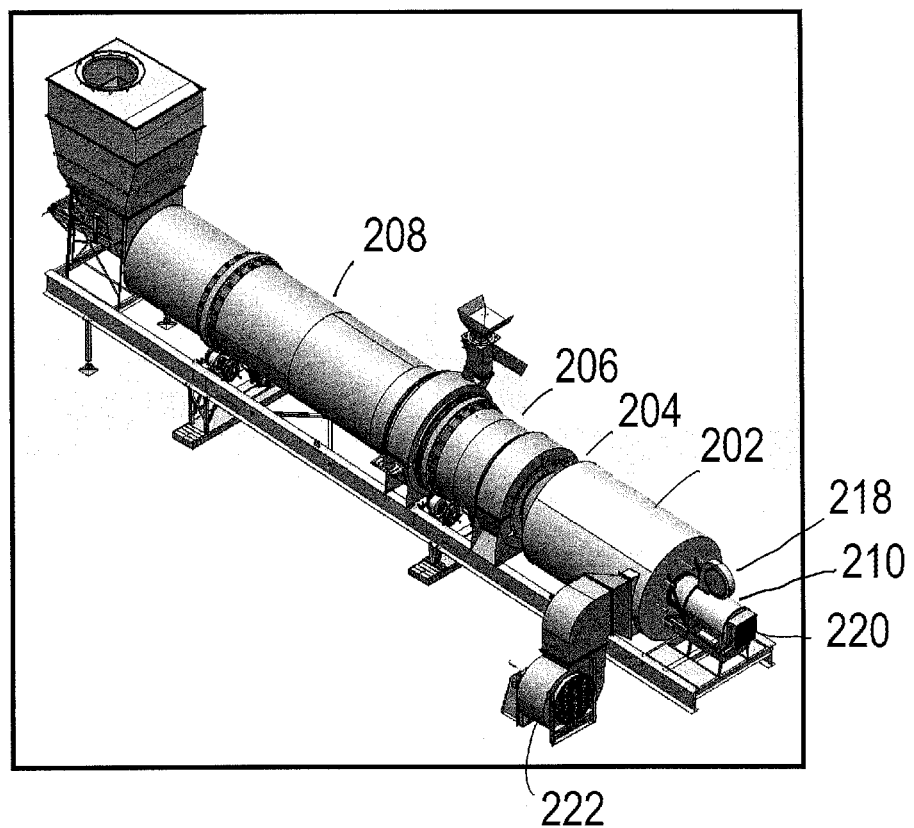
FIG. 1 shows a recycled asphalt plant according to an embodiment.
Figure 2:
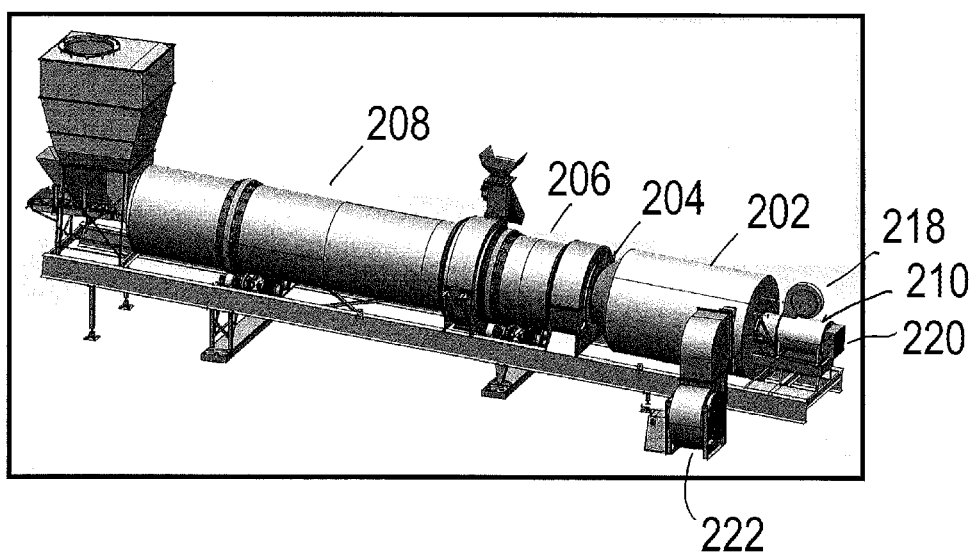
FIG. 2 shows a recycled asphalt plant according to an embodiment.
Figure 3:
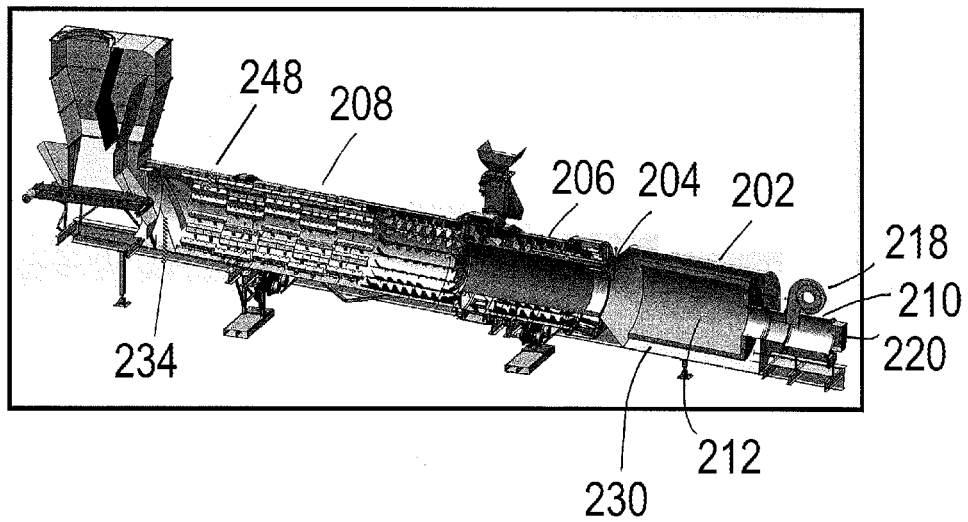
FIG. 3 shows a recycled asphalt plant according to an embodiment.
Figure 4A:
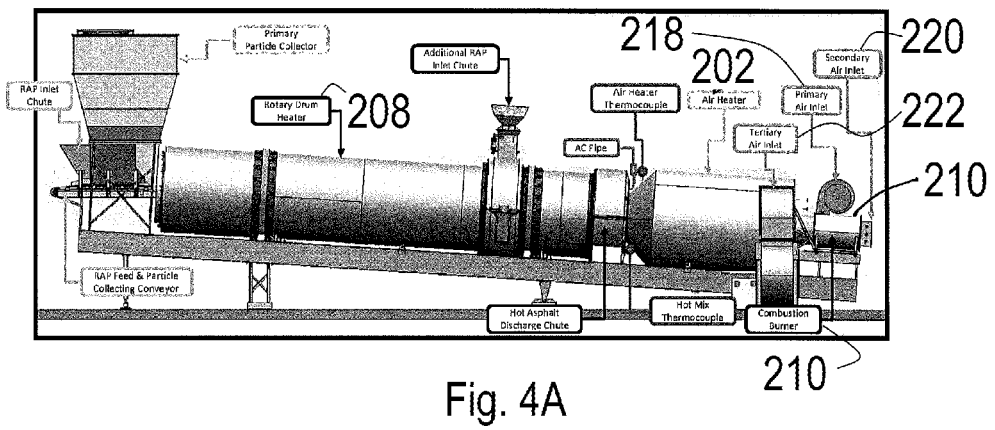
FIGS. 4A and 4B show a recycled asphalt plant according to an embodiment.
Figure 4B:
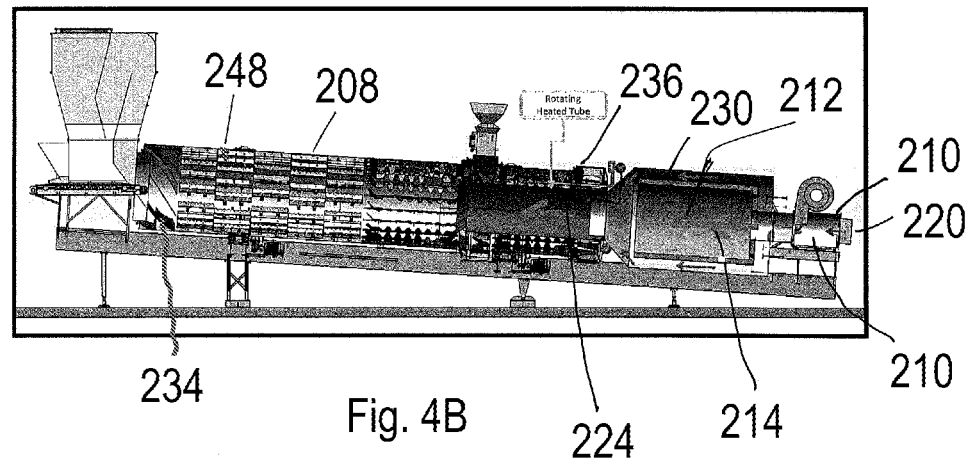
Figure 5:
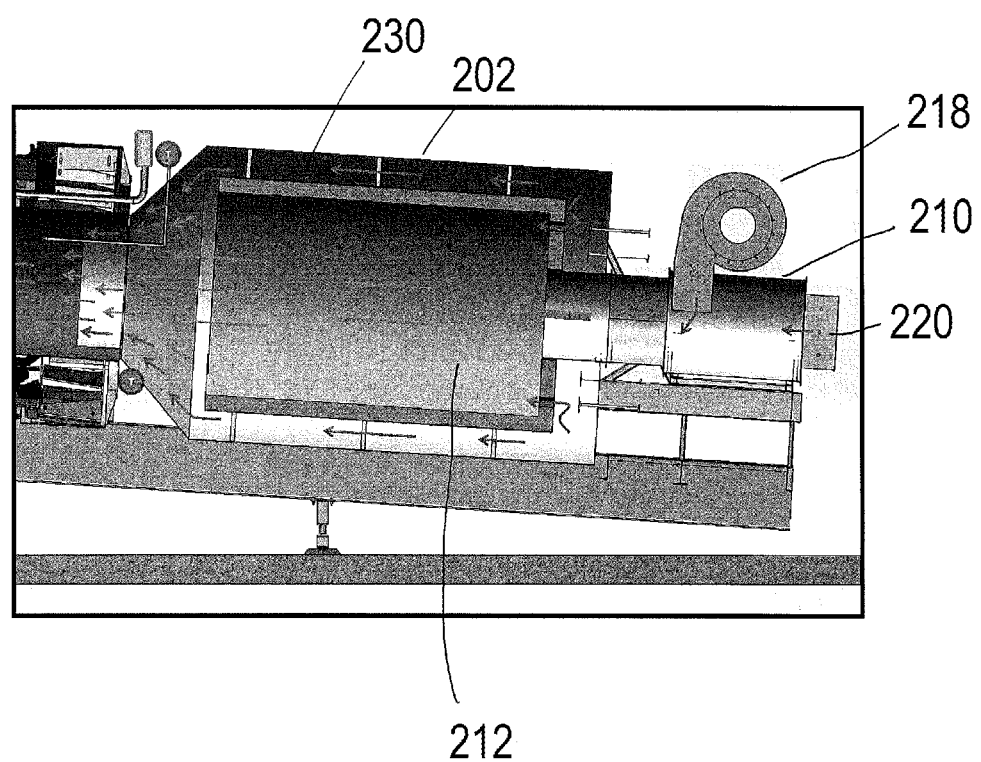
FIG. 5 shows a hot air generator according to an embodiment.
Figure 6:
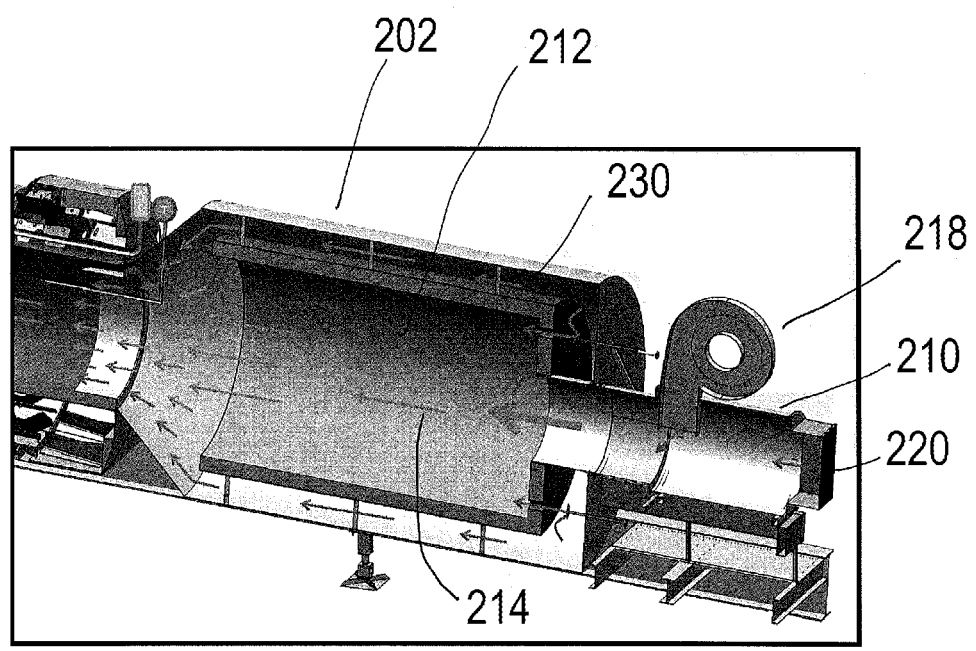
FIG. 6 shows a hot air generator according to an embodiment.
Figure 7:
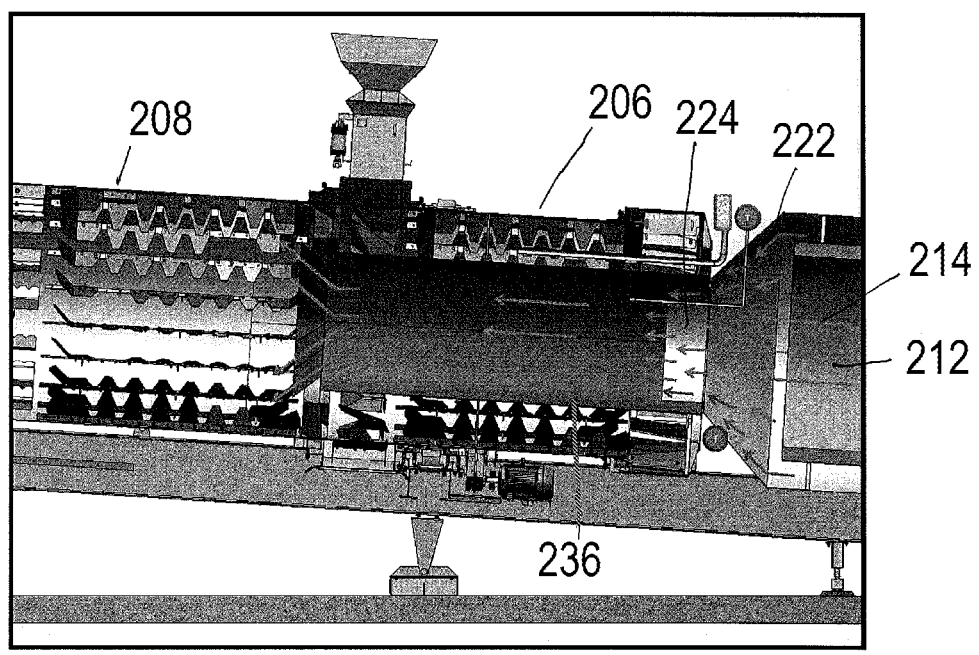
FIG. 7 shows a rotary dryer according to an embodiment.
Figure 8:
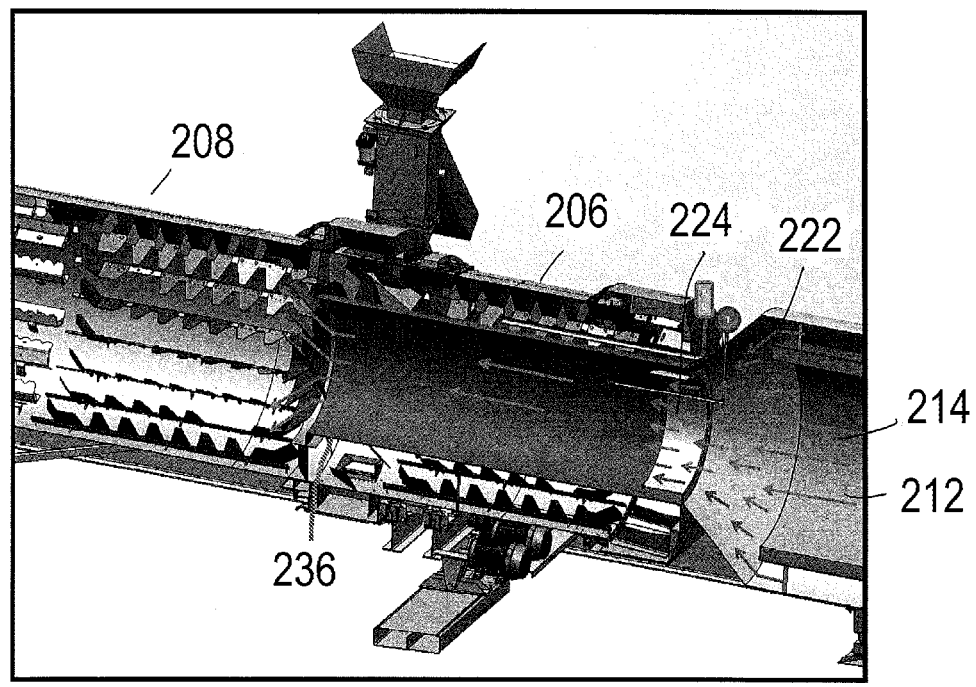
FIG. 8 shows a rotary dryer according to an embodiment.

This unique process describes a heating system and equipment that is designed to heat and enhance up to 100% recycled asphalt to the operating temperatures needed with a reduction in emissions and odors.

This is a system that uses the 2200° F. products of combustion and combines those high temperature products with fresh air or fresh air combined with recycled process gases to increase the temperature of the air while decreasing the temperature of the products of combustion to be maintained within an operating range of about 600°-900° F.

Gases at these temperatures are used to directly and gently heat and remove most of the moisture from a mixture of up to 100% recycled asphaltic materials while avoiding the formation of coke buildup in the combination rotary dryer-mixer. The higher energy level products created from the combustion of fossil fuels is converted into a gas stream of an equivalent lower energy level at a greater volume in this energy conversion process. Less heat is wasted or quenched in this process.

The high temperature gases at a given volume are increased in volume as the temperature is reduced the addition of cooler air or gases. This method will ensure that almost all of the particles of asphaltic recycled materials are gently exposed to a full volume of hot air to increase the temperature as the moisture is removed while being cascaded through the rotary dryer.

Controlling the temperature with hot air allows the temperature of the recycled asphaltic materials to be heated slowly with accuracy to slow the melting point of the bitumen until such time that is mixed with additional warm mix liquid asphalt and any additives as needed in a designated mixing zone of the rotary counter-flow dryer technology. In this manner melted bitumen is less likely to build up in the rotary dryer; it is less likely to be exposed to temperatures that will volatilize the hydrocarbons in the bitumen; it is less likely to cause the formation of hazardous emissions or blue smoke to the atmosphere. Using direct heat as opposed to indirect heating allows a more efficient use of energy resulting in lower emission levels of carbon dioxide.

This is a process that will allow the use of up to 100% recycled asphaltic mixture to be fed directly into the system; or allow a coarse aggregate mixture to be directly fed into the system while feeding a finer fractionated component with higher bitumen content into a zone near the end of the heating and drying zone. The screened or fractionated coarse portion of the mixture may require more heat exposure for a longer duration while the finer portion of a fractionated mixture may contain a higher percentage of bitumen, thus requiring less time to be heated, and stopping the buildup of melted bitumen in the drying portion of the rotary dryer. This provision will also allow the use of ground up shingles to be added to the asphaltic mixture at the same port.

This unique system has the provision for the addition of liquid bitumen or warm mix liquid bitumen into the mixing zone toward the end of the process. Additional additive pipes can be installed to the rotating mixing zone for the addition of mineral fillers, fibrous fillers, crumb rubber, anti-strip agents, glass or alternate road building materials. Liquids and fillers can be added to the mixing zone while the rotating dryer is in operation.

In this process indirect heat is added into the mixing zone of the rotary dryer. The mixing zone is designed to use the mechanical energy of the rotating rotary dryer and mixing devices to add the liquid and additive components of the final asphaltic mixture. The mixing zone of the rotary dryer is protected from direct heat with use of a large rotating tube that radiates heat into the mixing chamber. The tube metal temperature is controlled with the process air temperature, from the hot air generator, limiting the metal temperature to that of the process heating and drying air in the range of 600°-900° F. In this way the liquid warm mix bitumen, liquid additives, organic fillers, ground up shingles and the finer component of fractionated recycled asphaltic materials are not exposed to high temperature direct heat. Thus a proper mixing temperature will keep the mixing zone operating in a temperature range in which the bitumen can be melted but not coked, will provide an atmosphere to enhance mechanical mixing and will not stick to the mechanical mixing components used to enhance mixing in this zone.

Another unique component of the system is a large inertial mechanical particle separator placed at the feed end of the rotary dryer. The internal design of this collector is to collect both coarse and fine particles from the exhaust of the rotary dryer. As they are collected and separated, the internal design of the inertial separator directs these particles onto the surface of the underfeeding conveyor. The conveyor then directs and feeds the recycled asphaltic material and particles from the inertial separator into the rotary dryer.

Finer particles may be directed using ductwork to a baghouse filter to remove the finer particles in the range of 75 microns and finer. Those particles can then be returned to mixing zone of the rotary dryer using the same in-feed wheel located on the rotary dryer that is used to feed the finer fractionated particles from the screening process into the rotary dryer into the mixing zone.

The fully automatic control system design unique to this process is a multifunctional system control. The combustion burner control maintains the operating safety of the burner sequences while controlling the product exit temperature. This is accomplished by measuring and controlling not only the product temperature but using the exit gas temperature from the rotary dryer to influence the firing position of the burner based upon fluctuations in the exit gas temperature. This advanced temperature detection control parameter will adjust the burner firing position as the moisture level of the raw material feeding into the rotary dryer changes to maintain a constant product exit temperature.

Changes in the rotary dryer exit gas temperature will influence the burner heat input level. The control system also monitors the exit gas temperature from the dryer to set an operating safety set point limit and safety shut down sequences. Another partition of the control parameter is to control and maintain the process air temperature introduced into the hot rotating tube and rotary dryer by modulating the amount of tertiary air.

The hot air generator is mounted to the discharge end of the rotary dryer mixing zone. A combustion burner fires directly into a refractory lined chamber producing hot products of combustion at approximately 2200° F. using fuel, primary and secondary air. The purpose of the chamber is to allow the complete burnout of the fuel to maintain more efficient combustion. The length of the chamber is designed accordingly.

The refractory chamber is surrounded with an air annulus. Air is introduced into the annular area with a tertiary air fan. Tertiary air is mixed with the hot products of combustion at the exit of the chamber to create the desired control temperature for the air entering the hot rotating tube of the mixing zone of the rotary dryer. A control thermocouple located in the hot rotating tube monitors and signals the control to maintain set point temperature. The thermocouple also provides a high limit signal to protect the system from over temperature.

Recycled asphaltic materials are fed or directed into the rotating counter flow dryer. The materials are introduced into spiral shaped flights to move the material into the rotary dryer. The material feeds into multiple rows of adjustable bucket flights that pick up the material and cascade the material across the cross sectional area of the rotary dryer.

The adjustable feature of the flight allows the cascade effect to be adjusted to insure maximum particle distribution across the cross sectional area of the rotary dryer. Once the bucket flight is adjusted the particles will then be cascaded through the hot air stream for efficient heat transfer into the particles of recycled asphaltic materials. The rate of particle heating can be controlled in this manner. As the particles absorb heat the particle temperature will increase.

As the particle temperature approaches the melting point the particles will be subjected to specially designed mixing paddles in the heating zone of the rotary dryer. The mixing paddles keep the particles stirred and homogeneously mixed as they are prepared to advance into the mixing zone of the rotary dryer. As the particles move into the mix zone they can now be mixed with the finer fractionated recycled asphaltic materials before they are sprayed with the needed warm mix liquid asphalt and additives needed to prepare final asphalt product.

Figures 12A, 12B, 12C:
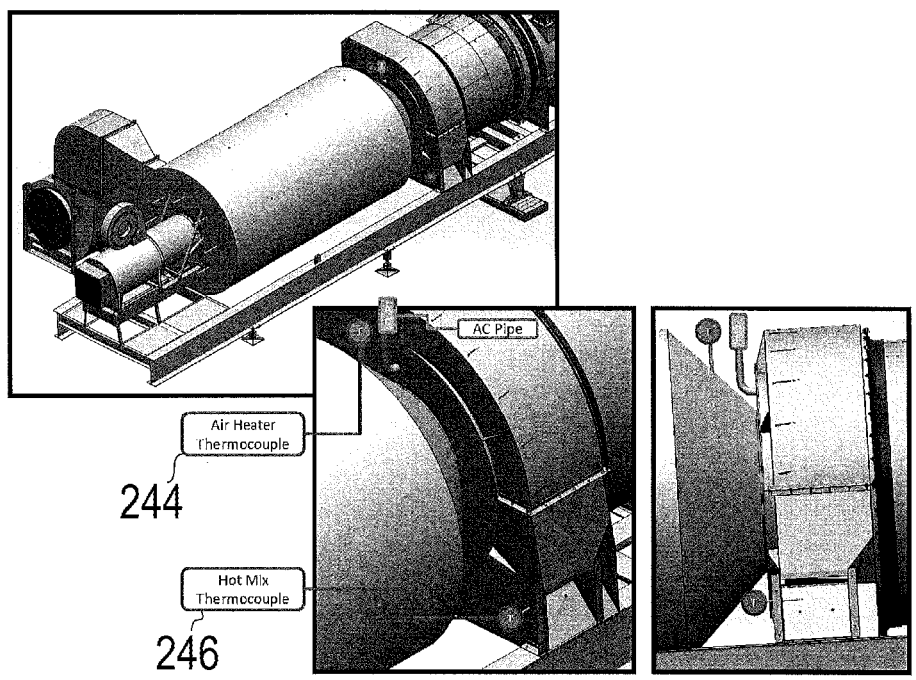
FIGS. 12A, 12B, and 12C show thermocouple placement according to an embodiment.
Figure 13A:
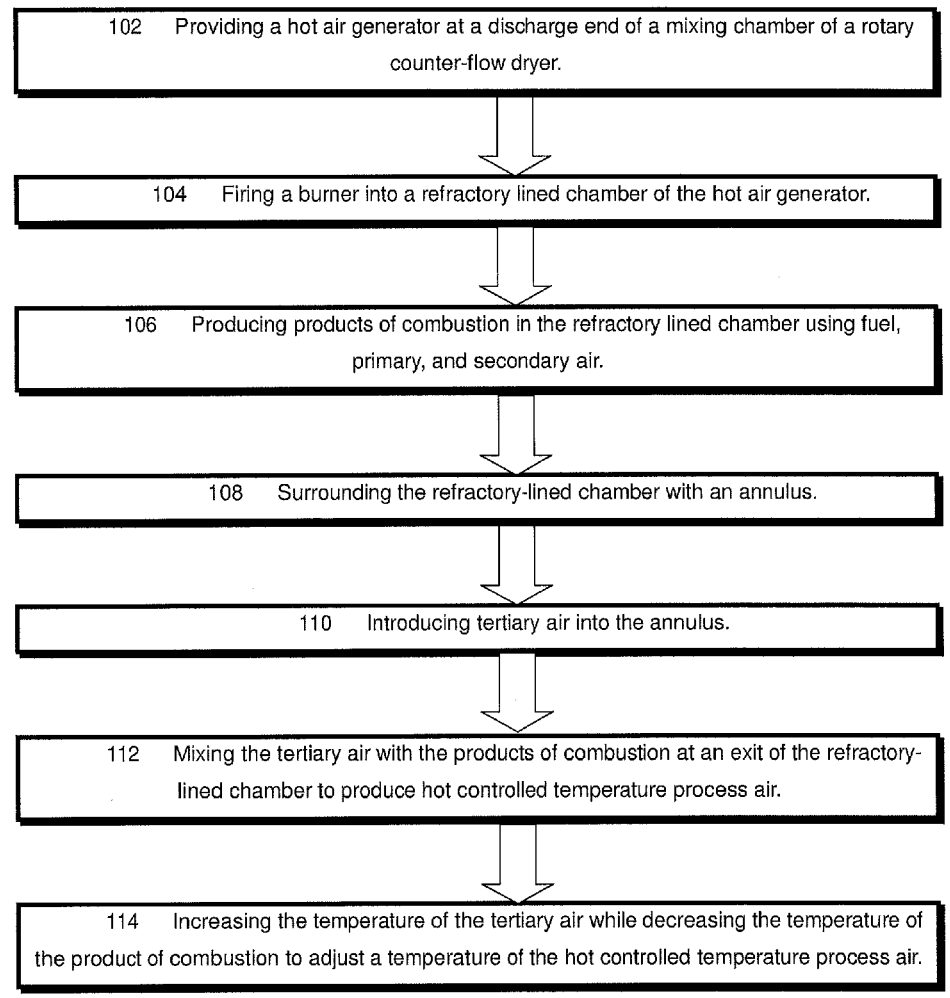
FIGS. 13A, 13B, and 13C show a method of making hot mix asphalt using recycled asphalt according to an embodiment.
Figure 13B:
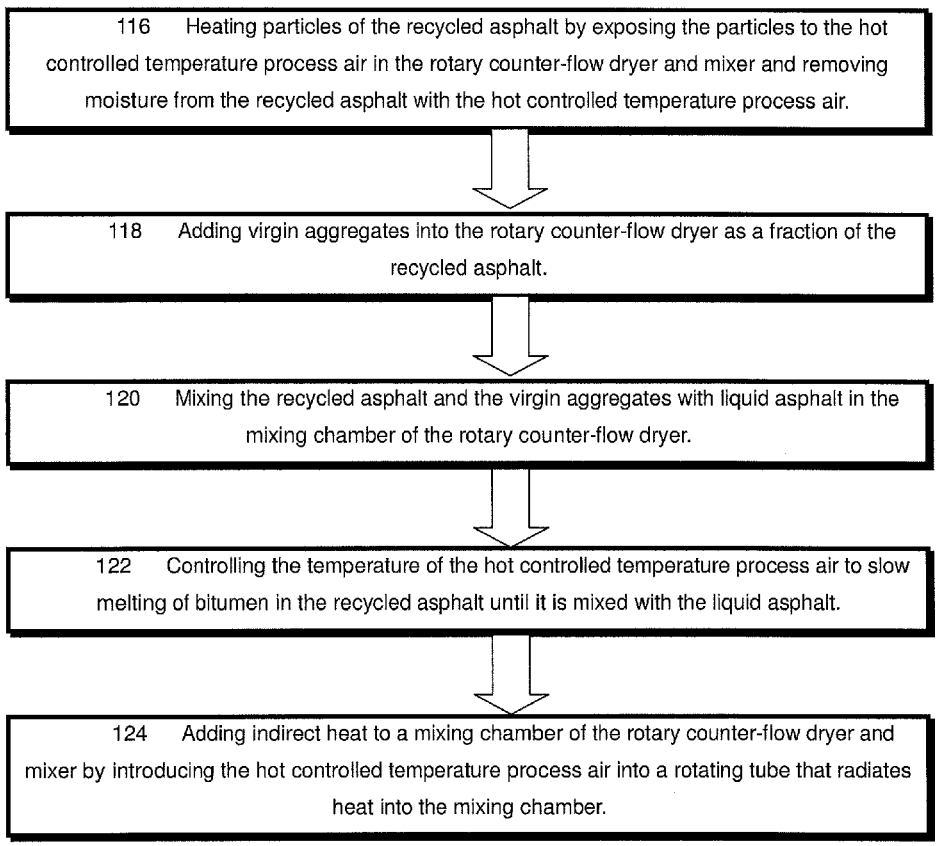
Figure 13C:
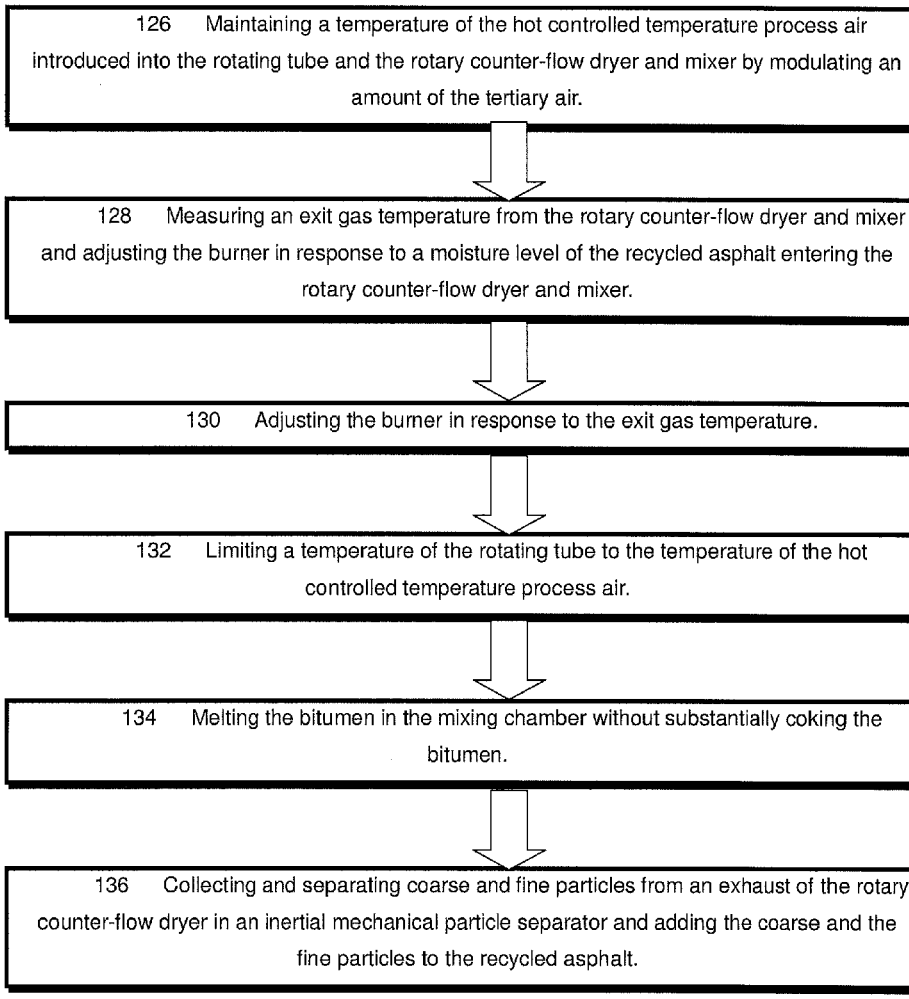

A method of making hot mix asphalt using recycled asphalt is shown in FIGS. 13A, 13B, and 13C. The method of making hot mix asphalt will be explained with respect to FIGS. 1, 2, 3, 4A, 4B, 5-8, 9A, 9B, 10, 11, 12A, 12B, and 12C. In a first operation 102, shown in FIG. 13A, a hot air generator 202 is provided at a discharge end 204 of a mixing chamber 206 of a rotary counter-flow dryer 208.

In a second operation 104, burner 210 is fired into a refractory-lined chamber 212 of the hot air generator 202.

In a third operation 106, products of combustion 214 are produced in the refractory-lined chamber 212 using fuel 216, primary air 218, and secondary air 220. In one embodiment, the products of combustion 214 are heated to about 2200° F.

In a fourth operation 108, the refractory-lined chamber 212 is surrounded with an annulus 230.

In a fifth operation 110, tertiary air 222 is introduced into the annulus 230.

In a sixth operation 112, the tertiary air 222 is mixed with the products of combustion 214 at an exit of the refractory-lined chamber 212 to produce hot controlled temperature process air 224. In one embodiment, the tertiary air 222 with a first volume and a first energy level is mixed with the products of combustion 214 at an exit of the refractory-lined chamber 212 to produce the hot controlled temperature process air 224 at a second volume and a second energy level. The second volume maybe substantially larger than the first volume and the first energy level may be substantially higher than the second energy level.

In a seventh operation 114, the temperature of the tertiary air 222 is increased while the temperature of the products of combustion 214 is decreased to adjust a temperature of the hot controlled temperature process air 224. A thermocouple 244 shown in FIG. 12B may be used to measure the temperature of the hot controlled temperature processor 224.

In an eighth operation 116, shown in FIG. 13B, the recycled asphalt 228 is heated by exposing the particles to the hot controlled temperature process air 224 in the rotary counter-flow dryer. In one embodiment, the fine dust particles 242 of the recycled asphalt 228 are added to the rotary counter-flow dryer 208 by spiral shaped flights 234. In another embodiment, the fine dust particles 242 are picked up in adjustable bucket flights 248 and cascaded across a cross-sectional area of the rotary counter-flow dryer 208.

In a ninth operation 118, virgin aggregates are added into the rotary counter-flow dryer 208 as a fraction of the recycled asphalt 228. In one embodiment, ground up shingles are added in the rotary counter-flow dryer 208 before the mixer 206.

In a $10^{th}$ operation 120, the recycled asphalt 228 and the virgin aggregates are mixed with liquid asphalt in the mixing chamber 206 of the rotary counter-flow dryer 208. In one embodiment, material such as liquid bitumen or foamed bitumen, mineral filler, fibrous filler, crumb rubber, anti-strip agents, glass, and alternative road building materials may be added into the mixing chamber 206 of the rotary counter-flow dryer 208. In another embodiment, the recycled asphalt 228 is subjected to specially designed mixing paddles in a heating zone of the rotary counter-flow dryer 208.

In an $11^{th}$ operation 122, the temperature of the hot controlled temperature process is controlled to slow melting of bitumen in the recycled asphalt 228 until it is mixed with the liquid asphalt.

In a $12^{th}$ operation 124, indirect heat is added to a mixing chamber 206 of the rotary counter-flow dryer 208 by introducing the hot controlled temperature process into a rotating tube 236 that radiates heat into the mixing chamber 206. In one embodiment, a temperature of the rotating tube 236 that radiates heat into the mixing chamber 206 is maintained within a range of about 600 to 900° F.

In a $13^{th}$ operation 126, shown in FIG. 13C, a temperature of the hot controlled process air 224 is introduced into the rotating tube 236 and the rotary counter-flow dryer 208 and mixer 206 is maintained by modulating an amount of the tertiary air 222. In one embodiment, the temperature of the hot controlled temperature process air 224 is maintained within a range of approximately 600° to 900° F.

In a $14^{th}$ operation 128, an exit gas temperature from the rotary counter-flow dryer 208 and mixer 206 is measured and the burner 210 is adjusted in response to a moisture level of the recycled asphalt 228 entering the rotary counter-flow dryer 208 and mixer 206.

In a $15^{th}$ operation 130 the burner 210 is adjusted in response to the exit gas temperature.

In a $16^{th}$ operation 132 a temperature of the rotating tube 236 is limited to the temperature of the hot controlled process temperature.

In a $17^{th}$ operation 134, the bitumen in the mixing chamber 206 is melted without substantially coking the bitumen.

A thermocouple 246 shown in FIG. 12B may be used to measure a temperature of the bitumen.

Figures 9A, 9B:
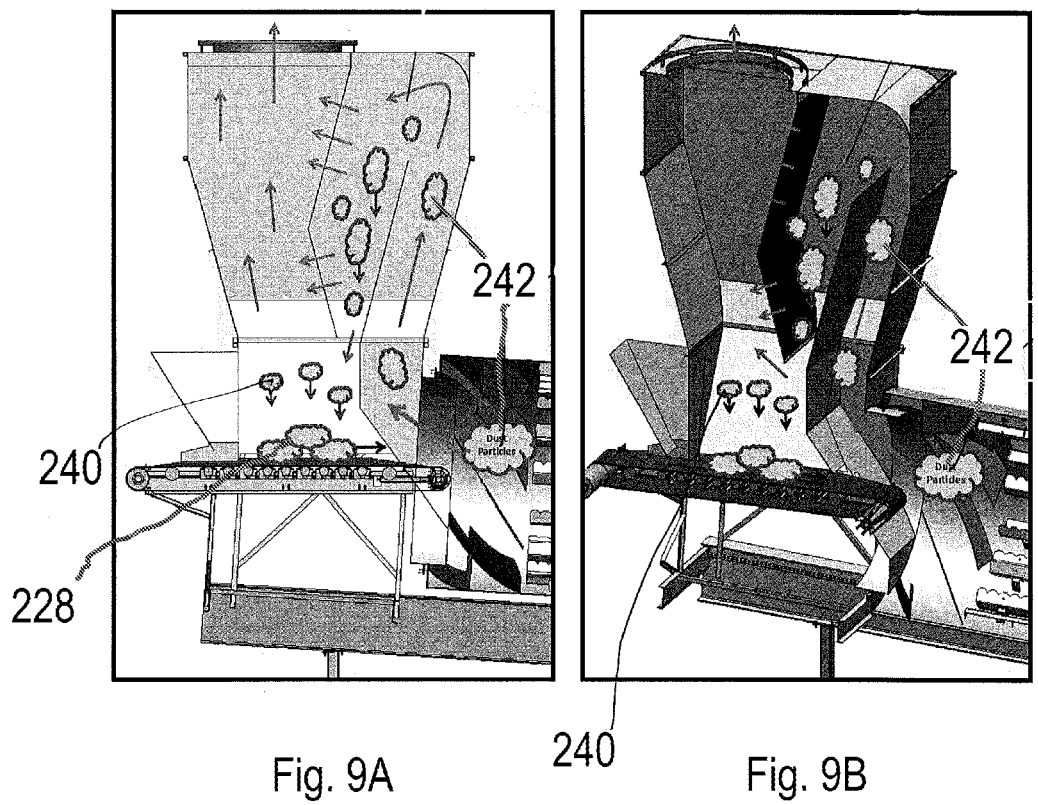
FIGS. 9A and 9B show an inertial mechanical particle separator breeching according to an embodiment.
Figure 10:
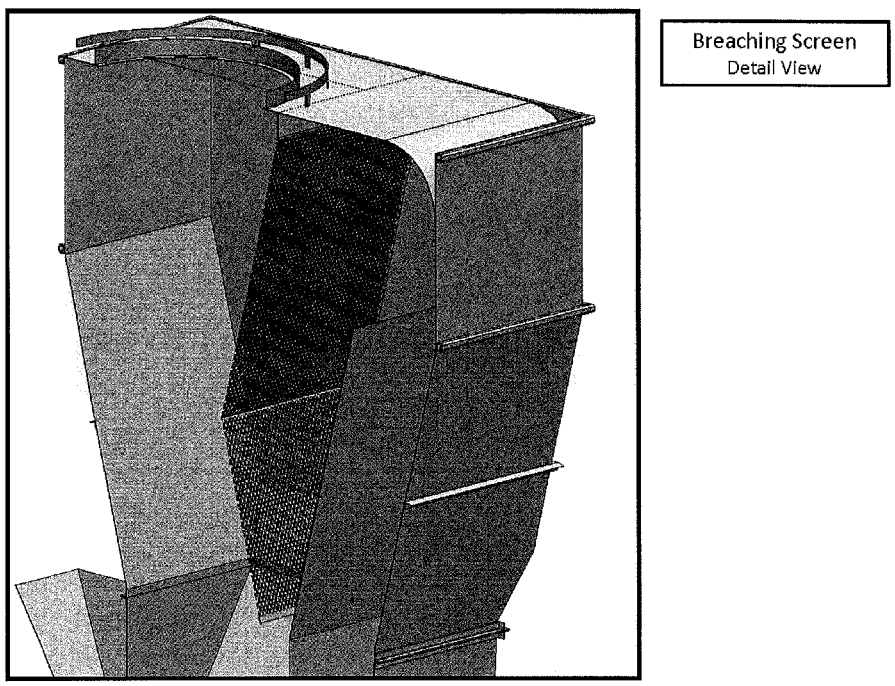
FIG. 10 shows a mechanical particle separator breeching screen according to an embodiment.
Figure 11:
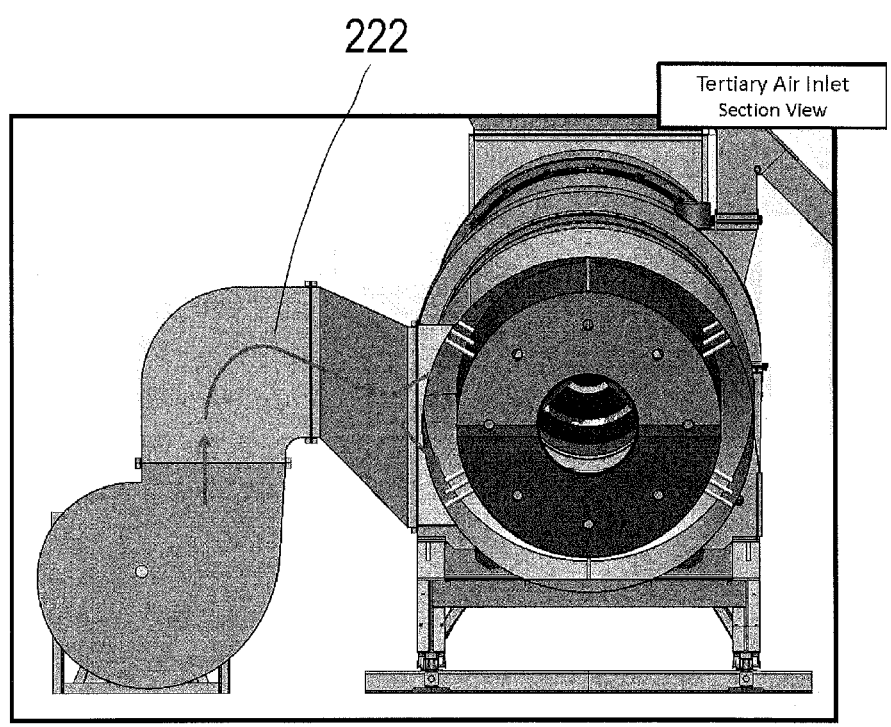
FIG. 11 shows a hot air generator and rotary dryer according to an embodiment.

In an $18^{th}$ operation 136, coarse and fine dust particles 240, 242 shown in FIGS. 9A and 9B are collected and separated from an exhaust of the rotary counter-flow dryer 208 in an inertial mechanical particle separator 238 and the coarse and the fine dust particles 240, 242 are added to the recycled asphalt 228. In one embodiment, the coarse dust particles 240 are added before the rotary counter-flow dryer 208 and the fine dust particles 242 are added after the rotary counter-flow dryer 208. In another embodiment, the coarse dust particles 240 may be exposed to heat for a longer duration than the fine dust particles 242.

The foregoing has described the principles, embodiments, and modes of operation of the present invention. However, the invention should not be construed as being limited to the particular embodiments described above, as they should be regarded as being illustrative and not restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A method of making hot mix asphalt using recycled asphalt, the method comprising:
    providing a hot air generator at a discharge end of a mixing chamber of a rotary counter-flow dryer;
    firing a burner into a refractory lined chamber of the hot air generator;
    producing products of combustion in the refractory lined chamber using fuel, primary, and secondary air;
    surrounding the refractory-lined chamber with an annulus;
    introducing tertiary air into the annulus;
    mixing the tertiary air with the products of combustion at an exit of the refractory-lined chamber to produce hot controlled temperature process air;
    increasing the temperature of the tertiary air while decreasing the temperature of the product of combustion to adjust a temperature of the hot controlled temperature process air;
    heating particles of the recycled asphalt by exposing the particles to the hot controlled temperature process air in the rotary counter-flow dryer and mixer and removing moisture from the recycled asphalt with the hot controlled temperature process air;
    adding virgin aggregates into the rotary counter-flow dryer as a fraction of the recycled asphalt;
    mixing the recycled asphalt and the virgin aggregates with liquid asphalt in the mixing chamber of the rotary counter-flow dryer;
    controlling the temperature of the hot controlled temperature process air to slow melting of bitumen in the recycled asphalt until it is mixed with the liquid asphalt;
    adding indirect heat to a mixing chamber of the rotary counter-flow dryer and mixer by introducing the hot controlled temperature process air into a rotating tube that radiates heat into the mixing chamber;

maintaining a temperature of the hot controlled temperature process air introduced into the rotating tube and the rotary counter-flow dryer and mixer by modulating an amount of the tertiary air;

measuring an exit gas temperature from the rotary counter-flow dryer and mixer and adjusting the burner in response to a moisture level of the recycled asphalt entering the rotary counter-flow dryer and mixer;

adjusting the burner in response to the exit gas temperature;

limiting a temperature of the rotating tube to the temperature of the hot controlled temperature process air;

melting the bitumen in the mixing chamber without substantially coking the bitumen; and collecting and separating coarse and fine particles from an exhaust of the rotary counter-flow dryer in an inertial mechanical particle separator and adding the coarse and the fine particles to the recycled asphalt.

2. The method of making hot mix asphalt with recycled asphalt of claim 1, further comprising heating the products of combustion to about 2200° F.

3. The method of making hot mix asphalt with recycled asphalt of claim 1, further comprising maintaining the temperature of the hot process air within a range of approximately 600° to 900° F.

4. The method of making hot mix asphalt with recycled asphalt of claim 1, further comprising mixing the tertiary air with a first volume and a first energy level of the products of combustion at an exit of the refractory-lined chamber to produce the hot controlled temperature process air at a second volume and a second energy level, the second volume substantially larger than the first volume and the first energy level substantially higher than the second energy level.

5. The method of making hot mix asphalt with recycled asphalt of claim 1, further comprising adding the coarse particles before the rotary counter-flow dryer and adding the fine particles in the mixing zone of the rotary counter-flow dryer.

6. The method of making hot mix asphalt with recycled asphalt of claim 5, further comprising exposing the coarse particles to heat for a longer duration than the fine particles.

7. The method of making hot mix asphalt with recycled asphalt of claim 1, further comprising adding ground up shingles in the mixing zone of the rotary counter-flow dryer.

8. The method of making hot mix asphalt with recycled asphalt of claim 1, further comprising adding a material into the mixing chamber of the rotary counter-flow dryer, the material selected from the group consisting of:
   liquid bitumen or foamed bitumen,
   mineral filler,
   fibrous filler,
   crumb rubber,
   anti-strip agents,
   glass, and
   alternative road building materials.

9. The method of making hot mix asphalt with recycled asphalt of claim 1, further comprising maintaining a temperature of the rotating tube that radiates heat into the mixing chamber within a range of 600° to 900° F.

10. The method of making hot mix asphalt with recycled asphalt of claim 1, further comprising feeding the particles of the recycled asphalt to the rotary counter-flow dryer by spiral shaped flights.

11. The method of making hot mix asphalt with recycled asphalt of claim 10, further comprising feeding the particles of the recycled asphalt to the rotary counter-flow dryer by spiral shaped flights.

12. The method of making hot mix asphalt with recycled asphalt of claim 1, further comprising picking their recycled asphalt up in an adjustable bucket flights and cascading the recycled asphalt across a cross-sectional area of the rotary counter-flow dryer.

13. The method of making hot mix asphalt with recycled asphalt of claim 1, further comprising subjecting the recycled asphalt to specially designed mixing paddles in a heating zone of the rotary counter-flow dryer.

* * * * *